United States Patent
Kim et al.

(10) Patent No.: US 10,496,715 B2
(45) Date of Patent: Dec. 3, 2019

(54) METHOD AND DEVICE FOR PROVIDING INFORMATION

(71) Applicant: Samsung Electronics Co., Ltd., Gyeonggi-do (KR)

(72) Inventors: Kyungtae Kim, Gyeonggi-do (KR); Hyerim Bae, Gyeonggi-do (KR); Jungjik Lee, Daejeon (KR); Changhyup Jwa, Jeju-do (KR); Yangwook Kim, Gyeonggi-do (KR); Sunkee Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 477 days.

(21) Appl. No.: 14/675,916

(22) Filed: Apr. 1, 2015

(65) Prior Publication Data

US 2015/0302095 A1 Oct. 22, 2015

(30) Foreign Application Priority Data

Apr. 17, 2014 (KR) ......................... 10-2014-0045929

(51) Int. Cl.
*G06F 16/9535* (2019.01)
*G06F 16/957* (2019.01)

(52) U.S. Cl.
CPC ...... *G06F 16/9535* (2019.01); *G06F 16/9574* (2019.01)

(58) Field of Classification Search
CPC ......... G06F 17/30864; G06F 17/30867; G06F 17/30424; G06F 17/30672;

(Continued)

(56) References Cited

U.S. PATENT DOCUMENTS 7,801,889 B2 * 9/2010 Kim ................... G06F 16/3322
                                                       707/731
8,078,602 B2 * 12/2011 Martin .............. G06F 17/30867
                                                       707/706

(Continued)

FOREIGN PATENT DOCUMENTS

| JP | 4715045 B2 | 4/2011 |
| KR | 2000-0054050 A | 9/2000 |
| KR | 10-2008-0041559 A | 5/2008 |

OTHER PUBLICATIONS

Chidlovskii, et al.; "Semantic cache mechanism for heterogeneous Web querying"; Computer Networks; 1999; pp. 1347-1360; Elsevier Science B.V.

(Continued)

*Primary Examiner* — Angelica Ruiz
(74) *Attorney, Agent, or Firm* — Cha & Reiter, LLC

(57) ABSTRACT

An electronic device, a keyword management device and a method are disclosed. The electronic device includes a processor that receives a keyword and a keyword search condition, transmits the keyword and the keyword search condition to a keyword management device to perform a search based on at least the keyword search condition, receives a search result from the keyword management device, and displays the search result and combines the search result, the keyword and the keyword search condition for subsequent retrieval. The keyword management device includes a processor that receives a keyword and keyword search condition from the electronic device, executes a search on at least one of a plurality of information providing servers utilizing the keyword and the keyword search condition, acquires the search result and combines the search result, the keyword and the keyword search condition for subsequent retrieval, and transmits the search result to the first electronic device.

17 Claims, 9 Drawing Sheets

(58) Field of Classification Search
CPC ......... G06F 17/30554; G06F 17/30675; G06F 17/30899; G06F 17/30634; G06F 17/30637; G06F 17/3064; G06F 17/30648; G06F 17/30657
See application file for complete search history.

(56) References Cited

U.S. PATENT DOCUMENTS

| | | | | |
|---|---|---|---|---|
| 2003/0004941 | A1* | 1/2003 | Yamada | G06F 17/30625 |
| 2006/0080292 | A1* | 4/2006 | Alanzi | G06F 17/30864 |
| 2007/0050335 | A1* | 3/2007 | Kashima | G06F 16/951 |
| 2007/0130139 | A1* | 6/2007 | Kim | G06F 16/3322 |
| 2007/0192168 | A1* | 8/2007 | Van Luchene | G06Q 10/047 705/14.54 |
| 2007/0282621 | A1* | 12/2007 | Altman | G06Q 10/10 705/319 |
| 2010/0042619 | A1* | 2/2010 | Jones | G06F 17/30867 707/770 |
| 2010/0332964 | A1* | 12/2010 | Duman | G06F 17/241 715/230 |
| 2011/0078487 | A1* | 3/2011 | Nielsen | G06Q 30/02 714/2 |
| 2011/0082878 | A1* | 4/2011 | Nozaki | G06F 17/3064 707/769 |
| 2011/0184936 | A1 | 7/2011 | Lymberopoulos et al. | |
| 2012/0151380 | A1* | 6/2012 | Bishop | G06Q 10/107 715/752 |
| 2012/0310914 | A1 | 12/2012 | Khan | |
| 2012/0311420 | A1* | 12/2012 | Penberthy | G06F 17/30 715/205 |
| 2012/0311465 | A1 | 12/2012 | Nealer et al. | |
| 2012/0316902 | A1 | 12/2012 | Kumar et al. | |
| 2013/0241952 | A1* | 9/2013 | Richman | G06F 17/21 345/619 |
| 2014/0280180 | A1* | 9/2014 | Edecker | G06F 17/30598 707/740 |

OTHER PUBLICATIONS

Luo, et al.; "Active Query Caching for Database Web Servers"; May 18, 2000; http://www.research.att.com/conf/webdb2000/PAPERS/2b.ps.

Angelaccio, et al.; "Efficient Wish in an Indoor Environment"; IEEE Microwave and Wireless Components Letters; Aug. 2003.

Martin, et al.; "Improving the Performance of Semantic Web Applications with SPARQL Query Caching"; 2010; Springer-Verlag Berlin Heidelberg.

* cited by examiner

METHOD AND DEVICE FOR PROVIDING INFORMATION

CROSS-REFERENCE TO RELATED APPLICATION

This application claims priority from and the benefit under 35 U.S.C. § 119(a) of Korean Patent Application No. 10-2014-0045929, filed on Apr. 17, 2014, which is hereby incorporated by reference for all purposes as if fully set forth herein.

TECHNICAL FIELD

The present disclosure relates to a method of providing keyword related information and a device for implementing the same.

BACKGROUND

An increasingly large amount of information is produced on the WEB (e.g., the internet), and users of the WEB wish to quickly find and view desired information, as retrieved from the vast sea of information available on the WEB. As a result, search strategies for rapidly and accurately finding user-desired information are continually a focus of web portal sites and search engines, and such technologies are continually being developed daily.

SUMMARY

Search technologies are capable of rapidly and accurately finding information for a user. However, in order to identify whether a search parameters were satisfied within the search, the user must often search the search result information for the search parameters. Accordingly, tedious study of the search result is required, when users would rather to accurately and rapidly identify user-indicated search parameters automatically and display the parameter information to the user, without necessitating access to the WEB.

The present disclosure provides a method and device for providing search information by an electronic device.

Specifically, an aspect of the present disclosure is to provide a method and device for displaying information (e.g., search results) when an electronic device acquires a keyword and a keyword search condition (e.g., search parameters), executes a search discovering a relevant search result satisfying the keyword search condition, and displays the discovered search result information to a user such that the search parameters are notated in some form.

In one aspect of this disclosure, a method of providing information by an electronic device is disclosed, including receiving a keyword and a keyword search condition associated with the keyword, transmitting the keyword and the keyword search condition to a keyword management device to perform a search based on at least the keyword search condition, receiving a search result from the keyword management device, and combining the search result, the keyword and the keyword search condition for subsequent retrieval.

In another aspect of this disclosure, an electronic device comprising a processor is disclosed, the processor to receive a keyword and a keyword search condition associated with the keyword, transmit by a communication interface the keyword and the keyword search condition to a keyword management device to perform a search based on at least the keyword search condition, receive a search result satisfying at least the keyword search condition from the keyword management device, and combine the search result, the keyword and the keyword search condition for subsequent retrieval.

In another aspect of this disclosure, a keyword management device is disclosed, including a processor, the processor to receive a keyword and keyword search condition from a first electronic device, execute a search on at least one of a plurality of information providing servers utilizing the keyword and the keyword search condition, acquire a search result and store the search result, the keyword and the keyword search condition for subsequent retrieval, and transmit the search result to the first electronic device.

Various embodiments of the present disclosure provide a method and device for providing information by an electronic device in which a user can receive desired search result in real time according to a preset search condition. In addition, according to the various embodiments of the present disclosure, a user may thus be able to recognize, at a glance, a search keyword and similar related information that the user desires to view, and movement can be applied to the display to center the display on a section of the search result showing the corresponding search keyword and/or the similar related information.

BRIEF DESCRIPTION OF THE DRAWINGS

The present disclosure will be more apparent from the following detailed description in conjunction with the accompanying drawings, in which.

DETAILED DESCRIPTION

Figure 1:
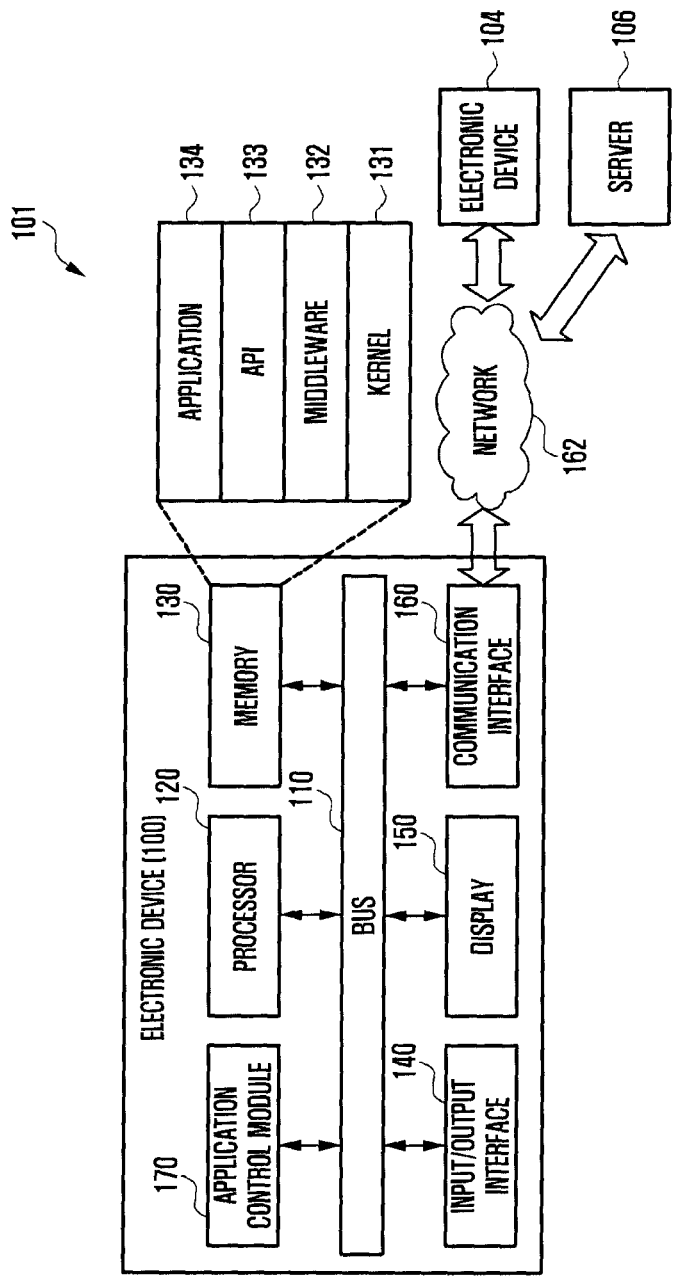
FIG. 1 illustrates a network environment including an electronic device according to an embodiment of the present disclosure.

In the related art, a user always has to input a particular condition at specific time to search for desired information through search engines or portal sites, and therefore it may be difficult for the user to rapidly and accurately discover required information in real time. In addition, in cases where a user executes a particular application program through an electronic device, a keyword and information that the user wants to discover may be contained in a region that is not displayed on a display of the electronic device among the entire display region of the application program, and therefore it may be difficult for the user to recognize the keyword and information.

Accordingly, in an electronic device for providing information, a method and device is required for effectively transferring and displaying desired information to a user. Various embodiments of the present disclosure provide a method and device for providing information by an electronic device through which a user can receive desired information in real time according to a preset search condition. In addition, various embodiments of the present disclosure provide a method and device for providing information in which a user can recognize, at a glance, a keyword and related information that the user wants to view and movement can be immediately made to the corresponding keyword and the related information.

Hereinafter, embodiments of the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed herein; rather, the present disclosure should be construed to cover all modifications, equivalents, and/or alternatives falling within the ambit of the disclosure. In the description of the drawings, identical or similar reference numerals are used to designate identical or similar elements.

As used herein, the expression "include" or "may include" refers to the existence of a corresponding function, operation, or element, and does not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic device according to the present disclosure may be a device that is configured to provide a user with information. For example, the electronic device may be a combination of one or more of a smartphone, a tablet personal computer, a mobile phone, a video phone, an e-book reader, a desktop personal computer, a laptop personal computer, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (e.g. a refrigerator, an air conditioner, a cleaner, an oven, a microwave oven, a washing machine, a vacuum cleaner, etc.), an artificial intelligent robot, a Television (TV), a Digital Video Disk (DVD) player, an audio player, various medical machines (e.g. a Magnetic Resonance Angiography (MRA), a Magnetic Resonance Imaging (MRI), a Computed Tomography (CT), a tomography camera, a sonography device, etc.), a navigation device, a Global Positioning System (GPS) receiver, an Event Data Recorder (EDR), a Flight Data Recorder (FDR), a set-top box, a TV box (e.g. SamSung HomeSync™, Apple TV™, or Google TV™), an electronic dictionary, a vehicle infotainment device, electronic equipment for a ship (e.g. navigation equipment for a ship, a gyrocompass, etc.), avionic equipment, a security device, an electronic cloth, an electronic key, a camcorder, a game console, a Head-Mounted Display (HMD), a flat panel display device, an electronic frame, an electronic album, a furniture or a part of a building/structure including a communication function, an electronic board, an electronic signature receiving device, a projector, etc. It is obvious to those skilled in the art that the electronic device according to the present disclosure is not limited to the aforementioned devices.

FIG. 1 illustrates a network environment 101 including an electronic device 100 according to an embodiment of the present disclosure.

Referring to FIG. 1, the electronic device 100 may include a bus 110, a processor 120, a memory 130, an input/output interface 140, a display 150, a communication interface 160, and an application control module 170.

The bus 110 may be a circuit that connects the aforementioned elements and transfers communication (for example, a control message) between the aforementioned elements.

The processor 120 may receive instructions from the aforementioned other elements (for example, the memory 130, the input/output interface 140, the display 150, the communication interface 160, and the application control module 170) through the bus 110 and decode the received instructions to perform calculation or data processing according to the decoded instructions.

The memory 130 may store instructions or data received from or generated by the processor 120 or the other elements (for example, the input/output interface 140, the display 150, the communication interface 160, and the application control module 170). The memory 130 may include programming modules, such as a kernel 131, a middle ware 132, an Application Programming Interface (API) 133, and applications 134. Each of the programming modules described above may be implemented by software, firmware, and hardware, or a combination of at least two thereof.

The kernel 131 may control or manage system resources (for example, the bus 110, the processor 120, and the memory 130) which are used to execute an operation or a function implemented in the remaining other programming modules, for example, the middle ware 132, the API 133, and the applications 134. In addition, the kernel 131 may provide an interface that enables the middle ware 132, the API 133, or the applications 134 to access individual elements of the electronic device 100 for control or management thereof.

The middle ware 132 may function as a relay for allowing the API 133 or the applications 134 to exchange data by communicating with the kernel 131. Furthermore, in regard to task requests received from the applications 134, the middleware 132 may perform a control (for example, scheduling or load balancing) for the task requests, by using a method of assigning, to at least one of the applications 134, a priority for using the system resources (for example, the bus 110, the processor 120, and the memory 130) of the electronic device 100.

The API 133 is an interface through which the applications 134 control functions provided by the kernel 131 and the middleware 132, and may include at least one interface or function (for example, instruction) for file control, window control, image processing, or text control.

According to various embodiments, the applications 134 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing an atmospheric pressure, humidity, temperature, and the like). Additionally or alternately, the applications 134 may include an application related to an information exchange between the electronic device 100 and an external electronic device (for example, an electronic device 104). The application related to the information exchange may include, for example, a notification relay application for transferring specific information to the external electronic device, or a device management application for managing the external electronic device.

For example, the notification relay application may include a function of transferring, to the external electronic device (for example, the electronic device 104), notification information generated from other applications of the electronic device 100 (for example, an SMS/MMS application, an e-mail application, a health management application, an environmental information application, and the like). Additionally or alternatively, the notification relay application may receive the notification information from, for example, the external electronic device (for example, the electronic device 104) and provide the received notification information to a user. The device management application may manage (for example, install, delete, or update), for example, at least some functions of the external electronic device (for example, the electronic device 104) communicating with the electronic device 100 (for example, turning on/off the external electronic device itself (or some elements thereof) or adjusting brightness (or resolution) of a display), applications operating in the external electronic device, or services provided from the external electronic device (for example, a telephone call service or a message service).

According to various embodiments, the applications 134 may include an application designated depending upon an attribute (for example, a type) of the external electronic device (for example, the electronic device 104). For example, in a case where the external electronic device is an MP3 player, the applications 134 may include an application related to the reproduction of music. Similarly, in a case where the external electronic device is a mobile medical appliance, the applications 134 may include an application related to health care. According to an embodiment, the applications 134 may include at least one of an application designated to the electronic device 100 and an application received from the external electronic device (for example, a server 106 or the electronic device 104).

The input/output interface 140 may transfer instructions or data, input from a user through an input/output device (for example, a sensor, a keyboard, or a touch screen), to the processor 120, the memory 130, the communication interface 160, or the application control module 170 through, for example, the bus 110. For example, the input/output interface 140 may provide, to the processor 120, data for a user's touch input through the touch screen. Furthermore, through the input/output device (for example, a speaker or a display), the input/output interface 140 may output instructions or data received from the processor 120, the memory 130, the communication interface 160, or the application control module 170 through the bus 110. For example, the input/output interface 140 may output voice data, processed through the processor 120, to a user through a speaker.

The display 150 may display various types of information (for example, multimedia data or text data) to a user.

The communication interface 160 may connect communication between the electronic device 100 and the external electronic device (for example, the electronic device 104 or the server 106). For example, the communication interface 160 may be connected to a network 162 through wireless or wired communication to communicate with the external device. The wireless communication may include at least one of, for example, Wi-Fi, Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like. The wired communication may include at least one of, for example, a Universal Serial Bus (USB), a High Definition Multimedia Interface (HDMI), Recommended Standard 232 (RS-232), or a Plain Old Telephone Service (POTS).

According to an embodiment, the network 162 may be a telecommunication network. The communication network may include at least one of a computer network, the Internet, the Internet of things, or a telephone network. According to an embodiment, a protocol (for example, a transport layer protocol, data link layer protocol, or a physical layer protocol) for communication between the electronic device 100 and the external device may be supported by at least one of the applications 134, the application programming interface 133, the middleware 132, the kernel 131, or the communication interface 160.

The application control module 170 may process at least some pieces of information acquired from the other elements (for example, the processor 120, the memory 130, the input/output interface 140, and the communication interface 160), and may provide the processed information to a user through various methods. For example, the application control module 170 may recognize information on connection components included in the electronic device 100, store the information on the connection components in the memory 130, and execute the applications 134 based on the information on the connection components.

Figure 2:
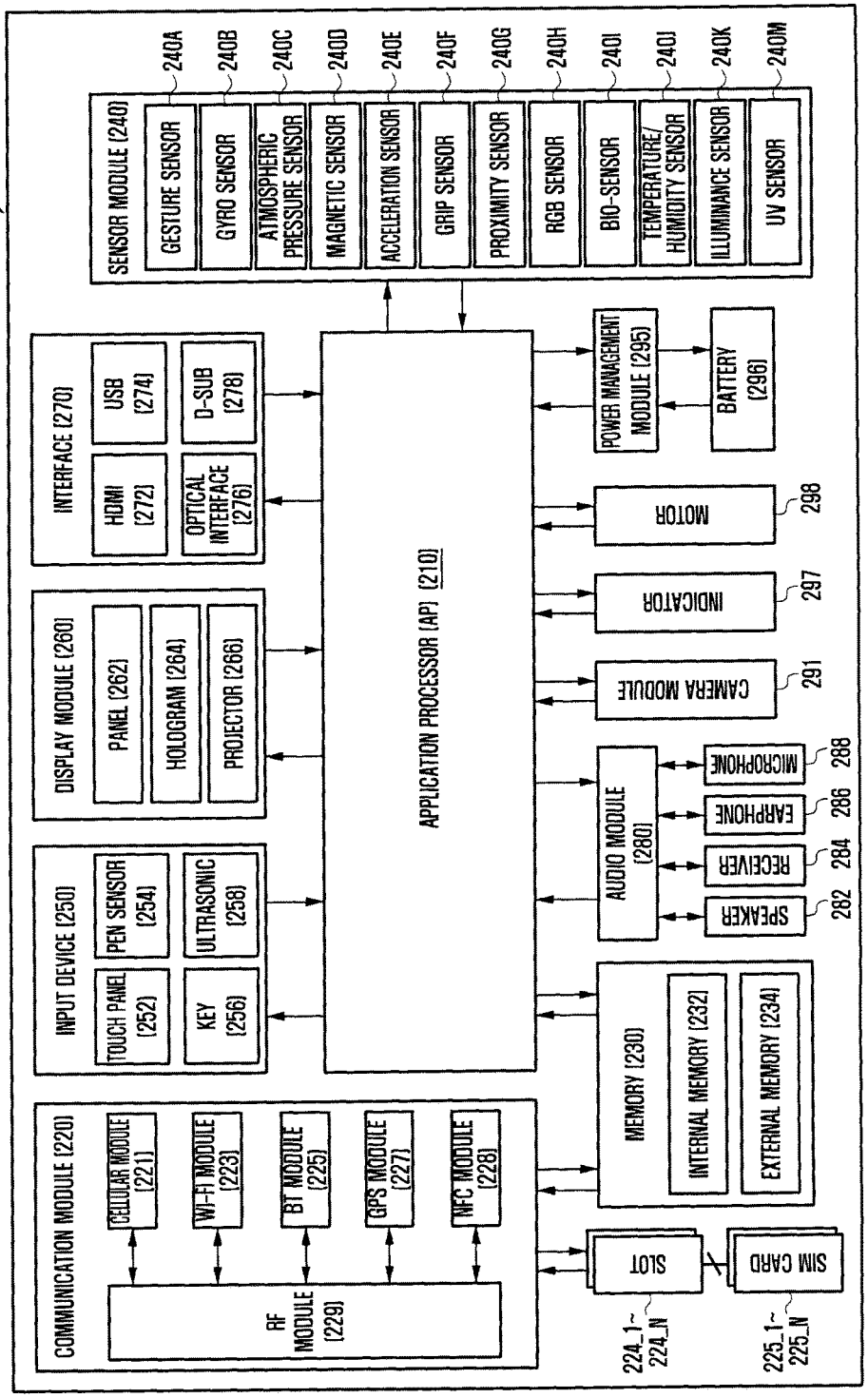
FIG. 2 is a block diagram of an electronic device according to various embodiments of the present disclosure.

FIG. 2 is a block diagram of an electronic device 200 according to various embodiments of the present disclosure.

The electronic device 200 may include, for example, all or some of the electronic device 100 illustrated in FIG. 1.

Referring to FIG. 2, the electronic device 200 may include at least one Application Processor (AP) 210, a communication module 220, a Subscriber Identification Module (SIM) card 225_1~225-N, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210 by driving an operating system or an application program, process various types of data including multimedia data, and perform calculations. The AP 210 may be implemented by, for example, a System on Chip (SoC). According to an embodiment, the AP 210 may further include a Graphic Processing Unit (GPU, not illustrated).

The communication module 220 (for example, the communication interface 160) may perform data transmission/reception in communication between the electronic device 200 (for example, the electronic device 100 in FIG. 1) and other electronic devices (for example, the electronic device 104 and the server 106 in FIG. 1) connected thereto through a network. According to one embodiment, the communication module 220 may include a cellular module 221, a Wi-Fi module 223, a BT module 225, a GPS module 227, an NFC module 228, and a Radio Frequency (RF) module 229.

The cellular module 221 may provide a voice call, a video call, a Short Message Service (SMS), or an Internet service through a communication network (for example, LTE, LTE-A, CDMA, WCDMA, UMTS, WiBro, or GSM). Furthermore, the cellular module 221 may distinguish and authenticate electronic devices within a communication network using a subscriber identification module (for example, the SIM card 225-1~225_N). According to one embodiment, the cellular module 221 may perform at least some functions which the AP 210 may provide. For example, the cellular module 221 may perform at least some of the multimedia control function.

According to an embodiment, the cellular module 221 may include a Communication Processor (CP). For example, the cellular module 221 may be implemented as an SoC. Although the elements such as the cellular module 221 (for example, a communication processor), the memory 230, and the power management module 295 are illustrated to be separate from the AP 210 in FIG. 2, the AP 210 may include at least some of the aforementioned elements (for example, the cellular module 221) according to an embodiment.

According to an embodiment, the AP 210 or the cellular module 221 (for example, communication processor) may load instructions or data, received from a non-volatile memory or at least one of the other elements connected thereto, to a volatile memory and process the loaded instructions or data. Furthermore, the AP 210 or the cellular module 221 may store data received from or generated by at least one of the other elements in a non-volatile memory. The AP 210 and/or the cellular module 221 may be the entirety or a part of the processor 120 described above with reference to FIG. 1.

For example, the Wi-Fi module 223, the BT module 225, the GPS module 227, and the NFC module 228 may include a processor for processing data transmitted/received through the corresponding module.

Although the cellular module 221, the Wi-Fi module 223, the BT module 225, the GPS module 227, and the NFC module 228 are illustrated as individual blocks in FIG. 2, at least some (for example, two or more) of the cellular module 221, the Wi-Fi module 223, the BT module 225, the GPS module 227, and the NFC module 228 may be included within one Integrated Chip (IC) or one IC package according to one embodiment. For example, at least some (for example, the communication processor corresponding to the cellular module 221 and the Wi-Fi processor corresponding to the Wi-Fi module 223) of processors corresponding to the cellular module 221, the Wi-Fi module 223, the BT module 225, the GPS module 227, and the NFC module 228 may be implemented as one SoC.

The RF module 229 may transmit/receive data, for example, an RF signal. For example, the RF module 229 may include a transceiver, a Power Amp Module (PAM), a frequency filter, a Low Noise Amplifier (LNA), or the like. For example, the RF module 229 may further include a component conductor or a conductive wire for transmitting/receiving an electromagnetic wave in a free space in wireless communication. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, or the NFC module 228 may transmit/receive an RF signal through a separate RF module according to one embodiment.

The SIM cards 225_1~225_N may be a card including a subscriber identification module and may be inserted into slots 224_1~224_N formed in particular positions of the electronic device 200. The SIM cards 225_1~225_N may include unique identification information (for example, an integrated circuit card identifier (ICCID)) or subscriber information (for example, an international mobile subscriber identity (IMSI)).

The memory 230 (for example, the memory 130 of FIG. 1) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected to the electronic device 200 through various interfaces. According to an embodiment, the electronic device 200 may further include a storage device (or storage medium) such as a hard disc drive.

The sensor module 240 may measure a physical quantity or detect an operating state of the electronic device 200 and convert the measured or detected information to an electronic signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, an illumination sensor 240K, or an Ultra Violet (UV) sensor 240M. Additionally or alternatively, the sensor module 240 may include an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor (not illustrated), an iris sensor (not illustrated), a fingerprint sensor (not illustrated), and the like. The sensor module 240 may further include a control circuit for controlling one or more sensors included therein.

The input device 250 may include a touch panel 252, a pen sensor 254, a key 256, or an ultrasonic input device 258. For example, the touch panel 252 may recognize a touch input through at least one of a capacitive type, a resistive type, an infrared type, or an acoustic wave type. The touch panel 252 may further include a control circuit. The capacitive type touch panel may recognize physical contact or proximity. The touch panel 252 may further include a tactile layer. In this case, the touch panel 252 may provide a user with a tactile reaction.

For example, the pen sensor 254 may be implemented by using the same or similar method to receiving a user's touch input or by using a separate recognition sheet. For example, the key 256 may include a physical button, an optical key, or a keypad. The ultrasonic input unit 258 may identify data by detecting an acoustic wave with a microphone (for example, microphone 288) of the electronic device 200 through an input unit for generating an ultrasonic signal, and may perform wireless recognition. According to an embodiment, the electronic device 200 may receive a user input from an external device (for example, a computer or server) connected thereto using the communication module 220.

The display 260 (for example, the display 150 of FIG. 1) may include a panel 262, a hologram device 264, or a projector 266. For example, the panel 262 may be a Liquid Crystal Display (LCD), an Active Matrix Organic Light Emitting Diode (AM-OLED), or the like. For example, the panel 262 may be implemented to be flexible, transparent, or wearable. The panel 262 may be formed to be a single module with the touch panel 252. The hologram device 264 may be a three dimensional image in the air by using interference of light. The projector 266 may project light onto a screen to display an image. For example, the screen may be located inside or outside the electronic device 200. According to one embodiment, the display 260 may further include a control circuit for controlling the panel 262, the hologram device 264, or the projector 266.

For example, the interface 270 may include a High-Definition Multimedia Interface (HDMI) 272, a Universal Serial Bus (USB) 274, an optical interface 276, or a D-sub-miniature (D-sub) 278. For example, the interface 270 may be included in the communication interface 160 illustrated in FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert a sound and an electrical signal. For example, at least some elements of the audio module 280 may be included in the input/output interface 140 illustrated in FIG. 1. For example, the audio module 280 may process voice information input or output through a speaker 282, a receiver 284, earphones 286, or a microphone 288.

According to one embodiment, the camera module 291 is a device that can capture still and moving images, and may include one or more image sensors (for example, a front sensor or a rear sensor), a lens (not illustrated), an image signal processor (ISP, not illustrated), or a flash (for example, an LED or a xenon lamp, not illustrated).

The power management module 295 may manage power of the electronic device 200. Although not illustrated, the power management module 295 may include, for example, a Power Management Integrated Circuit (PMIC), a charger Integrated Circuit (IC), or a battery or fuel gauge.

For example, the PMIC may be mounted to an integrated circuit or an SoC semiconductor. Charging methods may be classified into a wired charging method and a wireless charging method. The charger IC may charge a battery and prevent introduction of over-voltage or over-current from a charger. According to one embodiment, the charger IC may include a charger IC for at least one of the wired charging method and the wireless charging method. A magnetic resonance type, a magnetic induction type, or an electromagnetic type may be exemplified as the wireless charging method, and an additional circuit for wireless charging, such as a coil loop circuit, a resonance circuit, a rectifier circuit, and the like may be added.

For example, the battery fuel gauge may measure the remaining amount of battery 296, a charging voltage and current, or temperature. The battery 296 may store or generate electricity and supply power to the electronic device 200 using the stored or generated electricity. For example, the battery 296 may include a rechargeable battery or a solar battery.

The indicator 297 may display a particular state of the electronic device 200 or a part thereof (for example, the AP 210), for example, a boot-up state, a message state, a charging state, or the like. A motor 298 may convert an electrical signal into a mechanical vibration. Although not illustrated, the electronic device 200 may include a processing device (for example, a GPU) for supporting a mobile TV. For example, the processing unit for supporting a mobile TV may process media data according to, for example, a standard of Digital Multimedia Broadcasting (DMB), Digital Video Broadcasting (DVB), media flow, or the like.

The above described components of the electronic device according to various embodiments of the present disclosure may be formed of one or more components, and a name of a corresponding component element may be changed based on the type of electronic device. The electronic device according to the present disclosure may include at least one of the above-described elements. Some of the above-described elements may be omitted from the electronic device, or the electronic device may further include additional elements. Further, some of the components of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), or a programmable-logic device for performing operations which has been known or are to be developed hereinafter.

Figure 3:
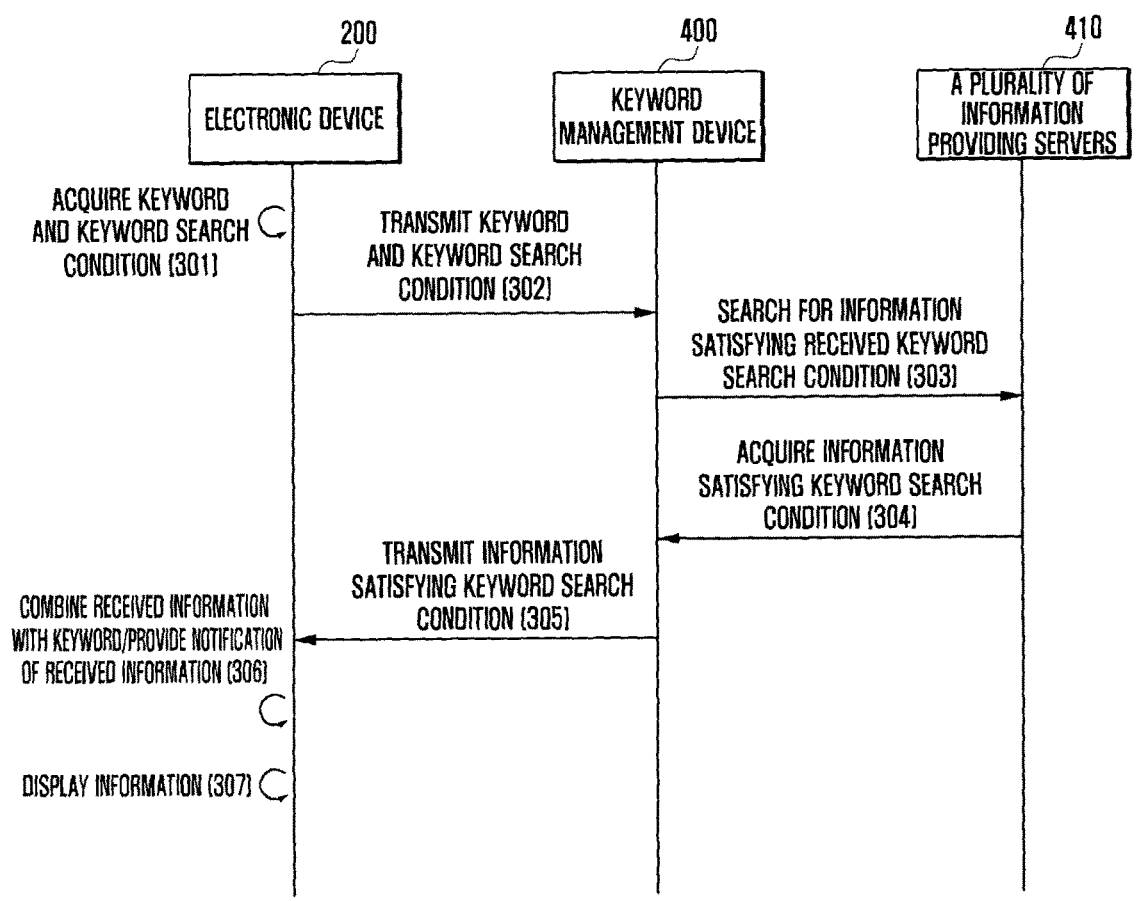
FIG. 3 illustrates an example process of providing information to a user by an electronic device according to an embodiment of the present disclosure.

FIG. 3 illustrates an example process of providing information to a user by the electronic device 200 according to an embodiment of the present disclosure.

Referring to FIG. 3, an information providing system according to various embodiments of the present disclosure may include the electronic device 200, a keyword management device 400, and a plurality of information providing servers 410 which are connected to each other through a network.

In step 301, the electronic device 200 may acquire a keyword and a keyword search condition. Referring to FIG. 2, the electronic device 200 may acquire a keyword and a keyword search condition that a user inputs through the input device 250, for example, the touch panel 252 or by recognizing the user's voice through the microphone 288.

In step 302, the electronic device 200 may transmit the acquired keyword and key word search condition to the keyword management device 400 through the communication module 220.

In step 303, based on the keyword search condition received from the electronic device 200, the keyword management device 400 may search the plurality of information providing server 410 to discover information satisfying the keyword search condition. The keyword management device 400 may search for updated information in the plurality of information providing servers 410 in real time. The plurality of information providing servers 410 may include in the search web servers for providing various types of content as well as search engines or portal sites.

The keyword management device 400, upon discovering the information satisfying the keyword search condition, may acquire the information from the plurality of information providing servers, in step 304. The keyword management device 400 may store, in a storage unit, the acquired information in conjunction with the keyword.

Thereafter, in step 305, the keyword management device 400 may transmit the information satisfying the keyword search condition to the electronic device 200.

In step 306, the electronic device 200 may combine the information, received from the keyword management device 400, with the keyword and provide the user with a notification that the information has been received. The notification may be provided to the user through, for example, sound, vibration, and other methods provided by the system.

In step 307, the electronic device 200 may output the received information on a display to enable the user to view the information, or through a sound output device to enable the user to listen to the information. The information may be output in conjunction with the keyword on the screen on which the corresponding keyword is output.

Figure 4:
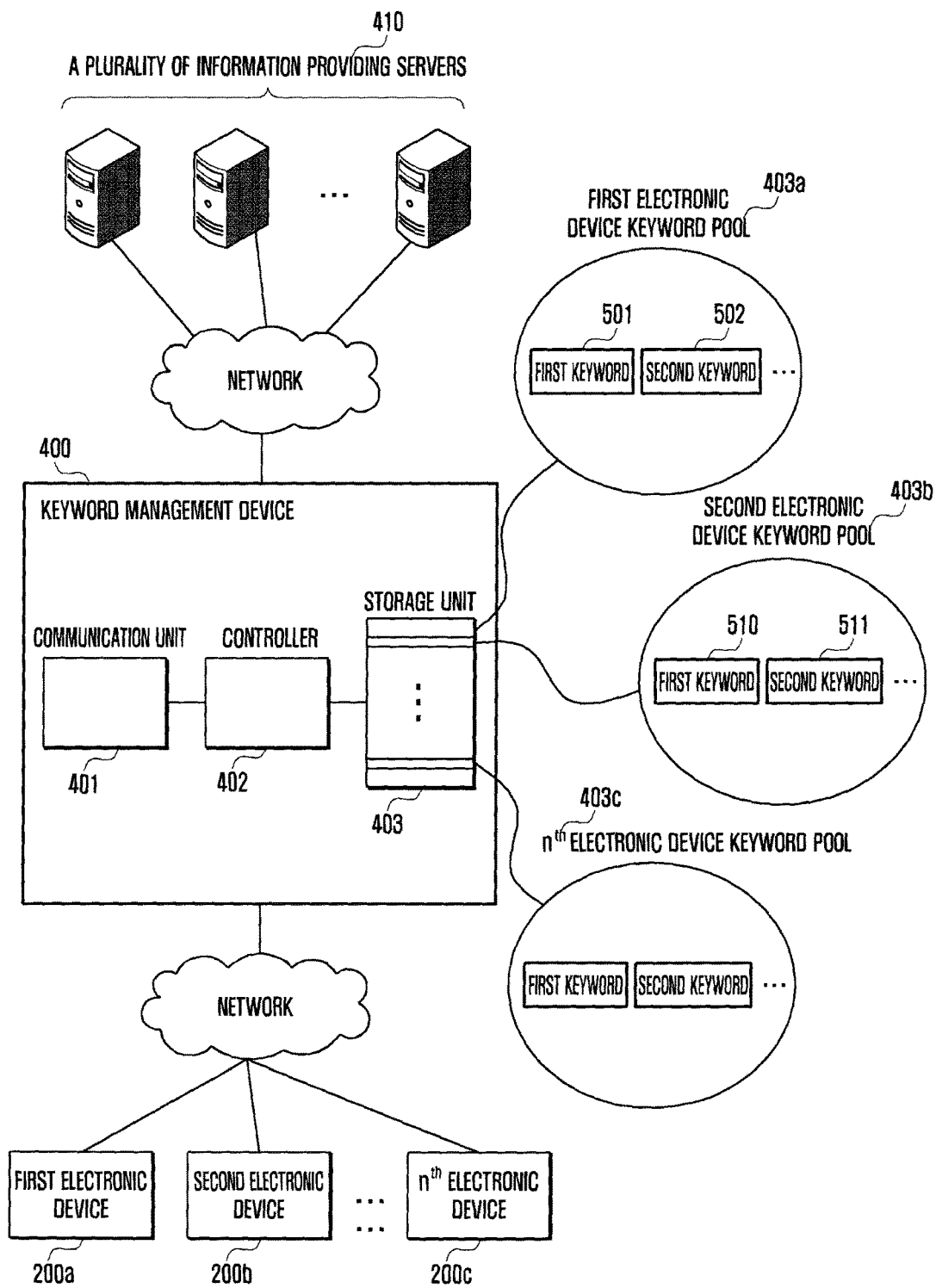
FIG. 4 illustrates a system representing an example process of an information providing method according to an embodiment of the present disclosure.

FIG. 4 illustrates a system representing an example process of an information providing method according to an embodiment of the present disclosure.

A plurality of electronic devices 200a to 200c may be connected to a keyword management device 400 through a network. Referring to FIG. 2, the electronic device 200 may acquire a keyword and a keyword search condition through the input device 250, for example, the touch panel 252, the pen sensor 254, the key 256, or the ultrasonic input device 258. Thus, one or any of the electronic devices 200a-200c may transmit the keyword and the keyword search condition to the keyword management device 400 through their respective communication modules 220 and, when the keyword management device 400 acquires information satisfying the keyword search condition, this information may be transmitted back to the requesting electronic device, which then receives the information from the keyword management device 400. The application processor 210 may combine the information received from the keyword management device 400 with the keyword. For example, the application processor may link the received information to the keyword, and a user may identify the received information at any time using On-Line Analytical Processing (OLAP) technique, data mining technique, and a text mining technique. The keyword, the keyword search condition, and the received information may be stored in the memory 230.

The keyword management device 400 may include a communication unit 401, a controller 402, and a storage unit 403. The communication unit 401 may be connected with the plurality of electronic devices 200a to 200c and a plurality of information providing servers 410 through a network. The controller 402 may acquire the keyword and the keyword search condition from the electronic device 200a, search for information satisfying the keyword search condition, and transmit the discovered information to the electronic device 200a. The storage unit 403 may store the keyword, the keyword search condition, and the acquired information. The keyword management device 400 may manage keyword pools 403a to 403c corresponding to the respective electronic devices 200a to 200c. Each of the keyword pools 403a to 403c may include a plurality of keywords 501 and 502, 510 and 511, etc.

Figure 5:
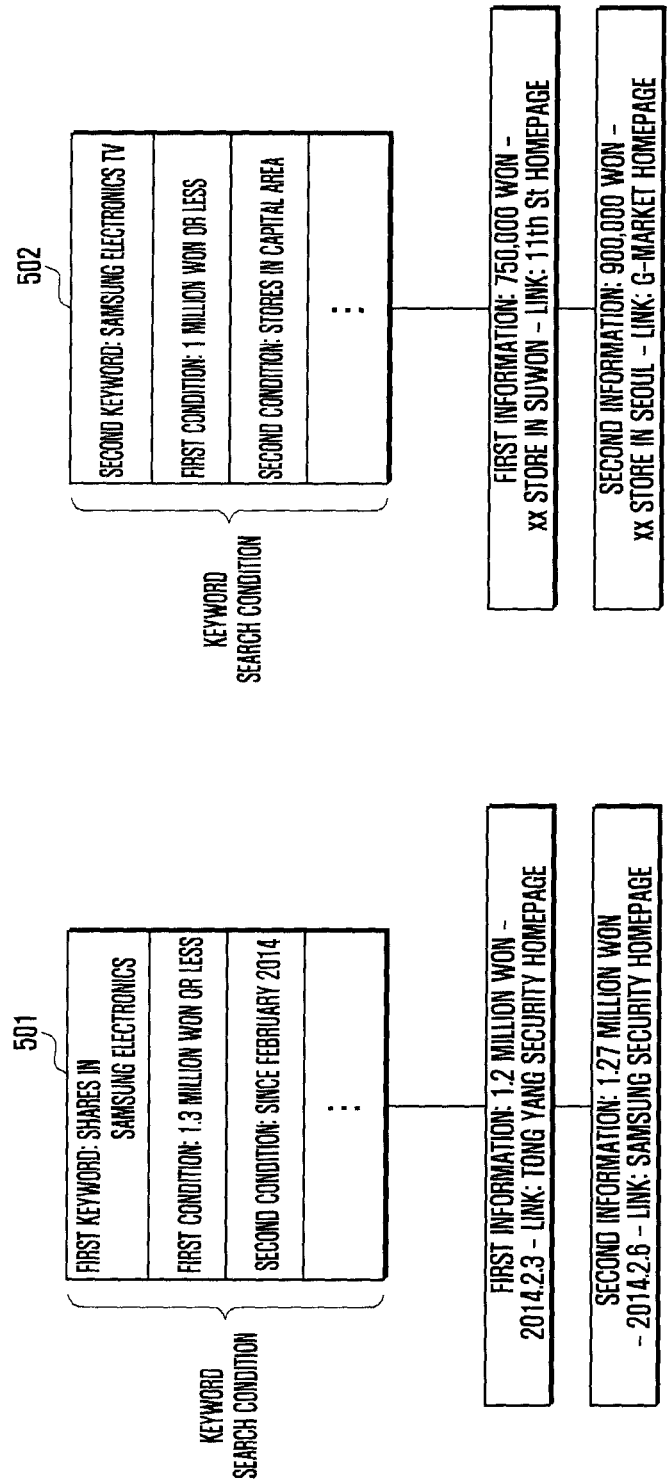
FIG. 5 illustrates a keyword pool stored in a first electronic device according to an example embodiment of the present disclosure.

FIG. 5 illustrates a keyword pool stored in the first electronic device according to an embodiment of the present disclosure.

Referring to FIG. 5, the first electronic device 200a may acquire a first keyword and a keyword search condition 501 associated with the first keyword from a user. For example, the first electronic device may receive input of the first keyword 'Shares in Samsung Electronics' (e.g., through the key 256) from the user. In addition, the user may set one or more keyword search conditions, which may help to more accurately discover the desired information. For example, a first condition '1.3 million won or less' and a second condition 'since February 2014' may be input as keyword search conditions associated with the first keyword.

The keyword management device 400, upon receiving this information from the electronic device, may search the plurality of information providing servers 410 to discover information matching the keyword and satisfying the first and second conditions. The operation by which the keyword management device 400 acquires the information from the plurality of information providing servers 410 may include directly receiving the information, storing the same in the storage unit 403 of the keyword management device, and combining the information with the keyword acquired from the first electronic device 200a. For example, when discovering a first information (e.g., a first search result) 'Shares in Samsung Electronics closed at 1.2 million won on Feb. 3, 2014' from the Tong Yang Security Homepage on the basis of the first condition '1.3 million won or less' and the second condition 'Since February 2014', the keyword management device 400 may acquire the discovered information (e.g., retrieving the relevant website or article or publication from the web) and combine it with the first keyword 'Shares in Samsung Electronics.'

When the user desires updated information, the keyword management device 400 may discover information satisfying the first and second conditions in real time even without an additional user input. For example, based on the first and second conditions, the keyword management device may acquire second information 'Shares in Samsung Electronics closed at 1.27 million won on Feb. 6, 2014' from the Samsung Security Homepage. The acquired information may be combined with the first keyword 'Shares in Samsung Electronics.'

After the keyword management device 400 acquires the information, the electronic device 200a may receive the information from the keyword management device 400. The electronic device 200a may combine the received information with the keyword stored in the memory 230 thereof and inform the user that the information has been received. In addition, the electronic device 200a may output the received information on the display 260 to enable the user to view it, and/or may output the received information through the speaker 282 to enable the user to listen to it. The information may be output in conjunction with the keyword on the screen on which the corresponding keyword is output.

According to another embodiment of the present disclosure, the keyword may include a character string, and the information satisfying the keyword search condition for the keyword may include at least one of a character string, an image, and a moving image. For example, when the electronic device 200a acquires a second keyword and a keyword search condition 502, the second keyword may include 'Samsung Electronics TV', and first information satisfying the keyword search condition for the second keyword may include at least one of prices, stores, images, and advertising videos for Samsung Electronics TVs in a web-based retailer (e.g., "11 th St" from FIG. 6) shopping homepage.

The keyword search condition is an additional input that may be utilized to more accurately search for information that a user wants to discover. The keyword search condition may be set by various methods, such as assigning a specific numerical value to the information that the user wants to discover. For example, when a specific film title or a specific company's product is input as a keyword, and information associated with the keyword is updated, a keyword search condition may be set such that the updated information is received from the plurality of information providing servers 410. When a particular portion of the information already associated with the keyword is updated, the keyword management device 400 may transmit the updated information to the electronic device 200a in real time.

Figure 6:
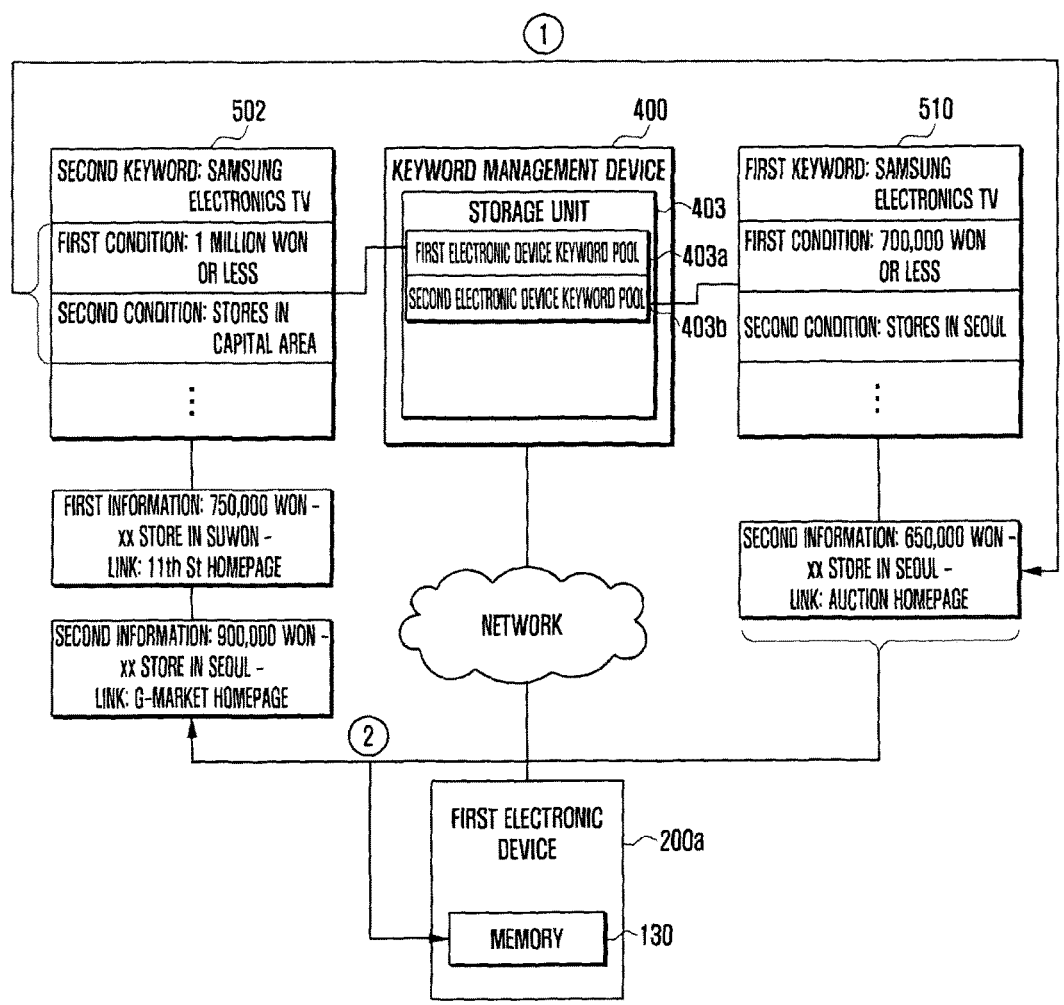
FIG. 6 illustrates an operation of receiving keyword related information of another electronic device through a keyword management device according to an embodiment of the present disclosure.

FIG. 6 illustrates an operation of receiving keyword related information of another electronic device through a keyword management device according to an embodiment of the present disclosure.

Referring to FIGS. 4 to 6, the keyword management device 400 may acquire a keyword and a keyword search condition 510 from another electronic device and acquire information satisfying the keyword search condition of the another electronic device from the plurality of information providing servers 410 to store the acquired information. That is, the keyword management device 400 may store, in the storage unit 403, the keyword pools 403a to 403c acquired from the electronic devices 200a to 200c (of FIG. 4) and information received from the information providing servers 410 to manage the keyword pools. Each of the keyword pools 403a to 403c may include a plurality of keywords 501 and 502, keyword search conditions for the keywords, and information satisfying the keyword search conditions.

The electronic device 200a may receive information which the another electronic device 200b has discovered in advance, without searching through the plurality of information providing servers 410 every time so as to discover information satisfying the keyword search condition 502. For example, the keyword management device 400 may receive the keyword and the keyword search condition 502 from the first electronic device 200a and then search the storage unit 403. When the information satisfying the user's keyword search condition 502 exists among the information included in the keyword pool 403b of the another electronic device 200b which has been stored in the storage unit 403, the corresponding information may be received from the keyword management device 400 rather than performing another search using the plurality of information providing servers 410. According to one embodiment of the present disclosure, when cross-authentication between the electronic device 200a and the another electronic device 200b is made, if the information satisfying the user's keyword search condition exists within the information included in the keyword pool 403b of the another electronic device, the corresponding information may be received from the keyword management device 400.

Figure 7:
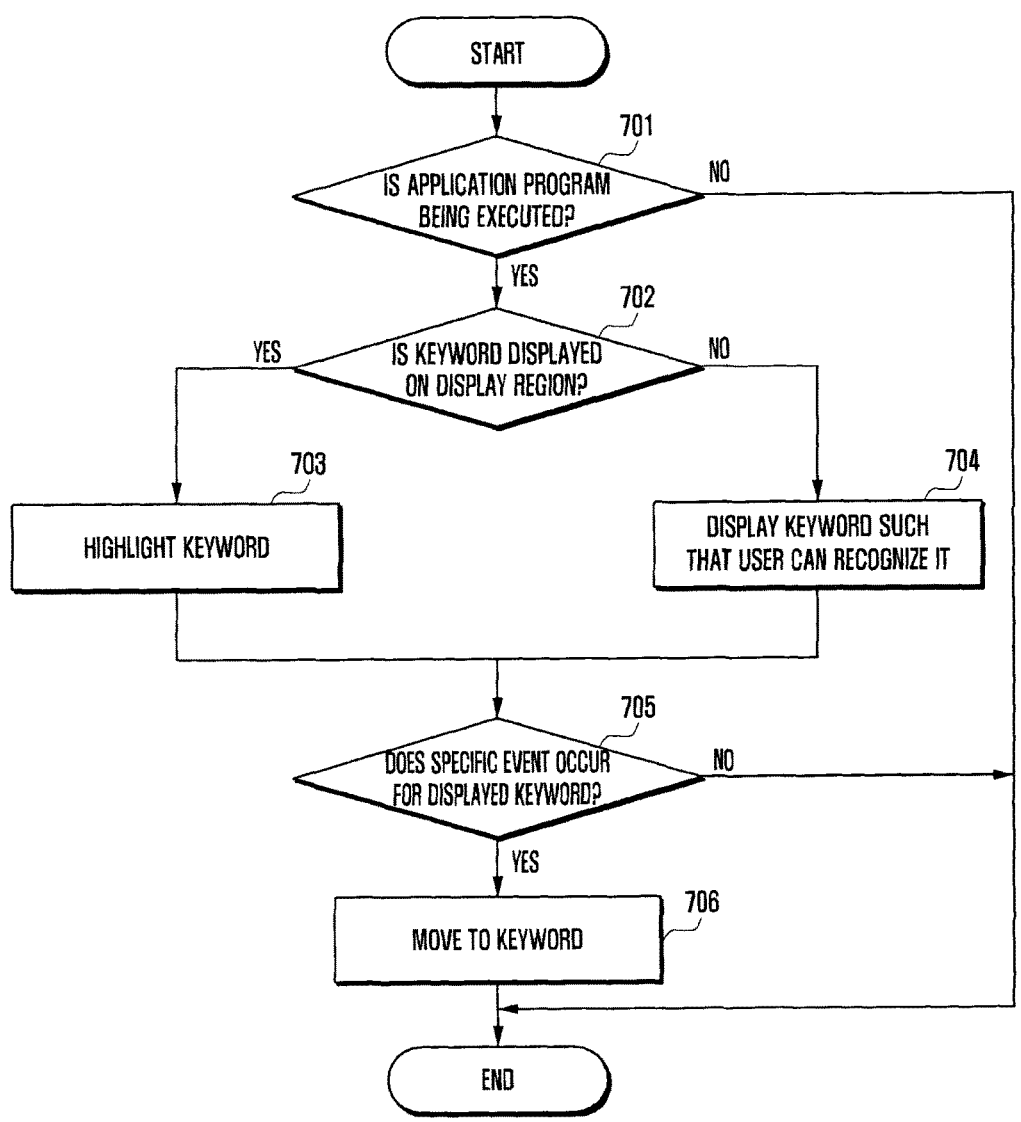
FIG. 7 is a flowchart illustrating a process of displaying a keyword on a display of an electronic device during execution of an application program according to an embodiment of the present disclosure.

FIG. 7 is a flowchart illustrating a process of displaying a keyword on a display of an electronic device during execution of an application program according to an embodiment of the present disclosure.

In step 701, an electronic device may determine whether an application program is being executed. Then, in step 702, the electronic device may detect whether a keyword is displayed in a region out of an entire display area of the executing application program.

When the keyword is displayed on the display region, the electronic device may highlight the keyword to enable a user to more easily recognize the keyword, in step 703. When the keyword is not displayed on the display region, the electronic device may display the keyword so that the user can recognize it, in step 704.

In step 705, the electronic device determines whether a particular event occurs for the highlighted or displayed keyword. The particular event may include a touch input, a key input, or a voice input. When the particular event occurs, movement (such as display scrolling, panning, etc.) may be made to the region including the corresponding keyword, in step 706.

Figure 8A:
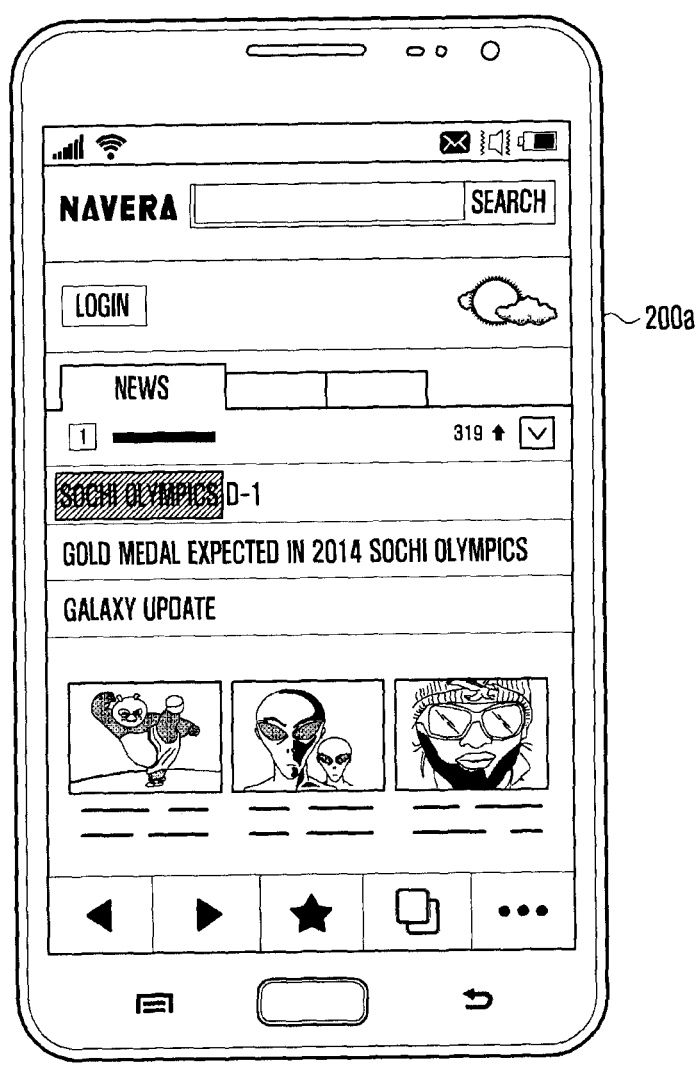
FIG. 8A and FIG. 8B illustrate examples of a screen on which an electronic device displays a keyword according to the method illustrated in FIG. 7.
Figure 8B:
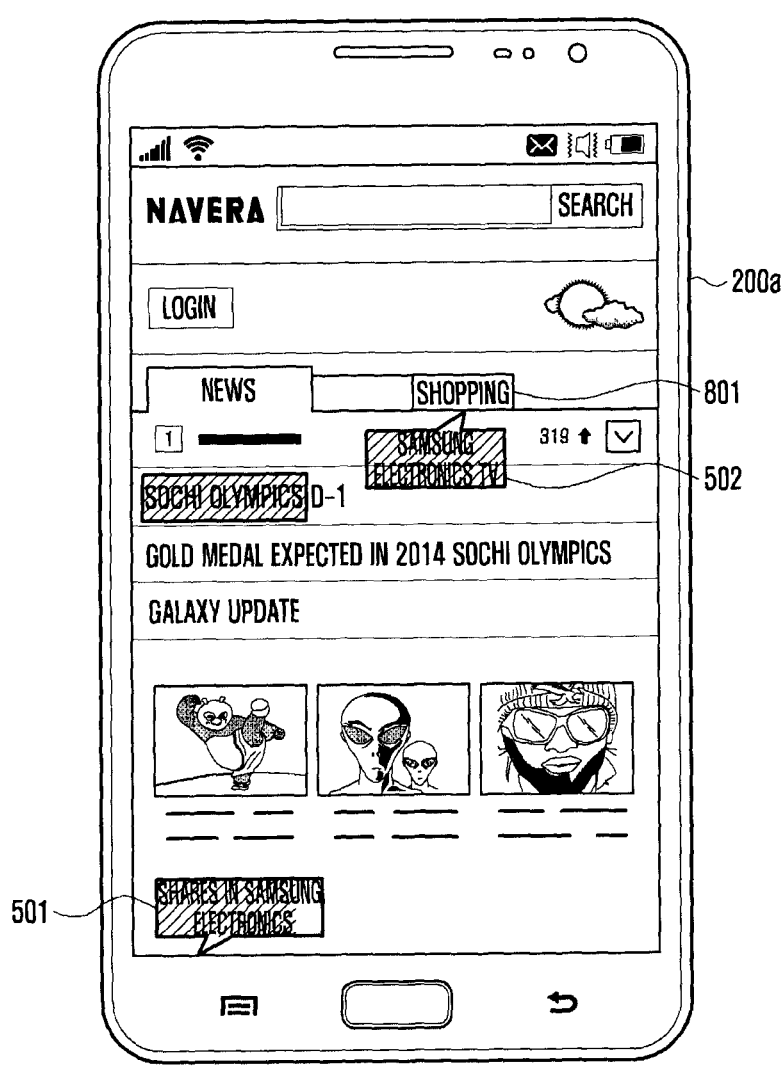

FIGS. 8A and 8B illustrate examples of a screen on which an electronic device displays a keyword according to the method illustrated in FIG. 7.

Referring to FIG. 8A, when a keyword is included in a region that is output on display region of an application program executing on the electronic device 200a, the electronic device may highlight the keyword. For example, when a user executes an Internet browser to view a webpage, if the keyword 'Sochi Olympics' is included in a displayed region of the running webpage, the electronic device may highlight the keyword 'Sochi Olympics,' as seen in FIG. 8A. The highlighting may take a variety of forms, such as application of a background color form, a focus ring, and particularized text formatting such as altering a font size, or using formatting such as bold, italic and underline effects to make the keyword distinct relative to its neighbors.

Referring to FIG. 8B, when a keyword is not displayed within a present display region of a running application program, the electronic device may display (instead of highlight) the keyword so that the user can recognize it. For example, when the user executes an Internet browser to view a webpage, and keywords 501 and 502 associated with information desired by a user are on an undisplayed portion of the webpage, or within a hidden element such as a presently non-displayed webpage currently represented by a tab, the electronic device may display the keywords 501 and 502 such that the user can recognize them. For example, if the keyword is situated in an undisplayed region invisible to the user (such as off-screen or on another web browser tab), the electronic device may display the keywords in a special format, such as a speech bubble to indicate they are present off-screen or on another browser tab. The electronic device may simultaneously highlight the keywords on the display of the electronic device (as illustrated previously in FIG. 8B) such that the user can recognize the presence of the keywords.

In addition, when a particular event, such as a touch input, a key input, or a voice input, occurs for the keyword which is displayed such that the user can recognize it, a movement (e.g., displaying scrolling or panning or switching tabs) may be made to a region including the corresponding keyword. That is, when the keyword 502 'Samsung Electronics TV' is displayed in a speech bubble form near a shopping tap menu 801 such that the user can recognize it, and a touch event occurs for the keyword, the shopping tab 801 may be opened to display the corresponding webpage and scrolling or panning may be conducted to place the keyword in view within the now displayed corresponding webpage.

According to various embodiments, at least some of the devices (for example, modules or functions thereof) or the method (for example, operations) according to the present disclosure may be implemented by a command stored in a computer-readable storage medium in a programming module form. When he command is executed by one or more processors (for example, the processor 210), the one or more processors may execute a function corresponding to the command. The computer-readable storage medium may be, for example, the memory 230. At least a part of the programming module may be implemented (for example, executed) by, for example, the processor 210. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may include hardware in the disclosure. Under the broadest reasonable interpretation, the appended claims are statutory subject matter in compliance with 35 U.S.C. § 101.

Meanwhile, the example embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. A method of providing information by an electronic device, comprising:

receiving, by at least one processor, input of a keyword and a keyword search condition;

executing a search by transmitting, using a communication unit, the keyword and the keyword search condition to a keyword management device, wherein the keyword management device stores the keyword and the keyword search condition in a keyword pool, wherein the keyword management device performs a first search based on the keyword and the keyword search condition and receives first search result information, and wherein when a request for updated search result information is received after the first search, the keyword management device performs a second search based on the keyword and the keyword search condition as stored in the keyword pool and receives updated search result information;

receiving, from the keyword management device, transmission of the updated search result information as retrieved from the second search;

storing an association between the updated search result information and the keyword in a storage of the electronic device;

displaying a pop-up message indicating that updated search result information is received; and in response to detecting a user input to the displayed pop-up message, displaying the updated search result information.

2. The method of claim 1, wherein displaying the updated search result information further comprises:
when the keyword is displayed in a display screen, in response to detecting a user input to the displayed keyword, displaying the updated search result information related to the keyword.

3. The method of claim 1, wherein displaying the pop-up message further comprises:
identifying whether the keyword is displayed within a display screen; and
in response to identifying that the keyword is displayed within the display screen, displaying the pop-up message.

4. The method of claim 1, wherein
performing the first search and the further searching further comprises querying a plurality of information providing servers using the keyword and the keyword search condition.

5. The method of claim 1, further comprising:
displaying a display screen including a first portion and a second portion, wherein the keyword is displayed in the second portion of the display screen, and
wherein displaying the pop-up message comprises displaying the pop-up message overlaid on the first portion.

6. The method of claim 5, further comprising:
receiving a user input to the pop-up message; and
displaying a part of page where the keyword is displayed.

7. The method of claim 1, wherein receiving the input of the keyword further comprising:
receiving a user input on at least one text displayed on a display; and
selecting the at least one text as the keyword.

8. An electronic device comprising:
a display;
a communication unit;
at least one processor; and memory storing programming instructions executable by the at least one processor to cause the electronic device to:
receiving input of a keyword and a keyword search condition,
execute a search by transmitting, using the communication unit, the keyword and the keyword search condition to a keyword management device, wherein the keyword management device stores the keyword and the keyword search condition in a keyword pool, wherein the keyword management device performs a first search based on the keyword and the keyword search condition and receives first search result information, and wherein when a request for updated search result information is received after the first search, the keyword management device performs a second search based on the keyword and the keyword search condition as stored in the keyword pool, and receives updated search result information,
receive, from the keyword management device, transmission of the updated search result information as retrieved from the second search,
store in the memory an association between the updated search result information and the keyword in the memory,
displaying a pop-up message indicating that updated search result information is received; and
in response to detecting a user input to the displayed pop-up message, display the updated search result information on the display.

9. The electronic device of claim 8, wherein displaying the updated search result information further comprises:
when the keyword is displayed in a display screen, in response to detecting a user input to the displayed keyword, displaying the updated search result information related to the keyword.

10. The electronic device of claim 8, wherein displaying the pop-up message further comprises:
identifying whether the keyword is displayed within a display screen; and
in response to identifying that the keyword is displayed within the display screen, displaying the pop-up message.

11. The electronic device of claim 8, wherein performing the first search and the further searching further comprises:
querying a plurality of information providing servers using the keyword and the keyword search condition.

12. The electronic device of claim 8, wherein the programming instructions are further executable by the processor to cause the electronic device to:
display a display screen including a first portion and a second portion, wherein the keyword is displayed in the second portion of the display screen,
wherein displaying the pop-up message comprises displaying the pop-up message overlaid on the first portion.

13. The electronic device of claim 8, wherein the programming instructions are further executable by the processor to cause the electronic device to:
receive a user input to a second pop-up message; and
display a part of page where the keyword is displayed.

14. The electronic device of claim 8, wherein receiving the input of the keyword further comprises:
receiving an input selecting at least one text displayed on the display indicating the at least one text as the keyword.

15. A keyword management device comprising:
at least one processor; and
a communication unit; and
a memory storing programming instructions executable by the at least one processor to cause the keyword management device to:
store in the memory a keyword pool including a plurality of keywords and information related to each of the plurality of keywords,
receive, by the communication unit, a request to add a keyword and a keyword search condition to the keyword pool from an external electronic device,
execute a first search based on the keyword and the keyword search condition and receive first search result information,
when a request for updated search result information is received after the first search, perform a second search based on the keyword and the keyword search condition as stored in the keyword pool, and receive the updated search result information,
in response to determining that the updated search result information is different from the first search result information, transmit the updated search result information to the external electronic device using the communication unit,
displaying a first web page and a tab representing a second undisplayed web page, and
when the keyword is present within the second undisplayed web page, displaying a pop-up window including the keyword, the pop-up window disposed substantially proximate to the tab to indicate presence of the keyword in the second undisplayed web page.

16. The keyword management device of claim 15 wherein performing the first search and the further searching further comprises: querying a plurality of information providing servers using the keyword and the keyword search condition.

17. The electronic device of claim 8, the programming instructions further executable by the at least one processor to cause the electronic device to:
   display a first web page and a tab representing a second undisplayed web page; and
   when the keyword is present within the second undisplayed web page, display a pop-up window including the keyword, the pop-up window disposed substantially proximate to the tab to indicate presence of the keyword in the second undisplayed web page.

\* \* \* \* \*